(12) United States Patent  
Grinbergs

(10) Patent No.: US 7,374,399 B2  
(45) Date of Patent: May 20, 2008

(54) INLINE FAN HOUSING ASSEMBLIES

(75) Inventor: Peter Karl Grinbergs, Dorchester (CA)

(73) Assignee: Nutech R. Hldgs Inc., London, Ontario (CA)

( * ) Notice: Subject to any disclaimer, the term of this patent is extended or adjusted under 35 U.S.C. 154(b) by 465 days.

(21) Appl. No.: 11/087,232

(22) Filed: Mar. 23, 2005

(65) Prior Publication Data

US 2005/0214145 A1   Sep. 29, 2005

Related U.S. Application Data

(60) Provisional application No. 60/555,682, filed on Mar. 24, 2004.

(51) Int. Cl.
  *F04D 29/44* (2006.01)
(52) U.S. Cl. ...................... 415/206; 415/221
(58) Field of Classification Search ............. 415/126, 415/127, 203, 206, 220, 214.1; 285/148.22, 285/148.23
See application file for complete search history.

(56) References Cited

U.S. PATENT DOCUMENTS 2,025,067 A * 12/1935 Miller ................. 285/148.23
2,507,535 A *  5/1950 Madsen ...................... 285/8
5,700,039 A * 12/1997 Manning .............. 285/148.23
6,527,005 B2 *  3/2003 Weaver ..................... 137/312

* cited by examiner

*Primary Examiner*—Ninh H. Nguyen
(74) *Attorney, Agent, or Firm*—Keusey, Tutunjian & Bitetto, P.C.

(57) ABSTRACT

The present invention relates to an inline fan housing assembly adaptable for connection with conduits of various diameters. The inline fan housing assembly comprises a connector collar for connection to the inlet or exhaust ports of the fan housings to adapt the fan housings for connection to a variety of conduits having diameters not designed to connect with the inlet or exhaust ports of the fan housing. The inline fan housing assembly also comprises an inner inlet ring for adapting the inlet port of the inline fan housing to direct air into motorized impellor of various sizes mounted within the inline fan housing. The connector collars of the present invention contain one or more steps, each step suitable for connection with a conduit of a different diameter. In one exemplary embodiment, the inner steps of the connection collar are removable thereby allow for increased air flow through the connection.

16 Claims, 7 Drawing Sheets

INLINE FAN HOUSING ASSEMBLIES

CROSS-REFERENCE TO RELATED APPLICATION

The present application claims the benefit of the filing date of U.S. Provisional Patent Application Ser. No. 60/555,682, filed Mar. 24, 2004, the disclosure of which is incorporated herein by reference.

FIELD OF INVENTION

The present invention relates to fan housings for ventilation systems. More specifically, the present invention relates to inline fan housing assemblies adaptable for use with a variety of ventilation conduits.

BACKGROUND OF INVENTION

Many building structures (residential, commercial and industrial buildings) comprise an inherent ventilation system for providing fresh air to various zones throughout the structure.

Typical building structures cannot rely on the natural flow of fresh or treated air throughout the structure to provide for proper ventilation. Construction techniques and materials have advanced to the point where buildings have become tighter and better sealed against the unintentional ingress of outdoor air and gases and the egress of internal air or other gases.

The principle way to ensure adequate ventilation within a building structure is to install a ventilation system. Usually, such a ventilation system comprises of an array of ventilation shafts (or ducts) and inline fans (having motorized impellers) which together are used to transport fresh, heated, cooled, filtered or treated air from an inlet supply to various regions or zones of the building structure.

As building structures vary substantially in size, different types of ventilation shafts have been designed to handle suitable amounts of air for a given application. Many factors (such as size of the building structure, number of residing people, exterior climate, etc.) result in the ventilation shafts and inlet supply elements, or conduits, having a number of different diameters corresponding to the needs of the building structure. Conduits are typically available with diameters ranging from 4 inches to more than 18 inches. Corresponding inline fans have a variety of requirements with respect to the movement of the air mass.

Inline fan housings and motorized impellers are typically sized to match the conduits they are connected to and as a result, a variety of inline fan housing sizes and motorized impellor sizes exist, each for use in specific applications.

A typical inline fan housing assembly has a fan housing comprising an inlet housing and an exhaust housing each comprising a port of a suitable diameter to connect with the corresponding conduit. A motorized impellor is mounted within a cavity defined by the housings for drawing air in through the inlet port and pushing air out through the exhaust port. Inline fan housings have been sized to correspond with the varying diameters of conduits with which they interface as well as the impellers which they house. Impellor diameter may also vary depending on the application and diameter of the conduits that the ventilation system employs. The inlet housing and exhaust housing may be a single housing referred to as the fan housing.

As various building structures utilize conduits having a number of different diameters and various lengths, it is necessary to have a large variety of inline fans available to properly effect each application. Storing, carrying and transporting a large number of inline fans is costly and requires a warehouse, transportation equipment such as trucks and/or vans and manpower.

Therefore, there is a need to alleviate the requirement of maintaining a large number of different sized motorized impellors and fan housings for each application.

SUMMARY OF INVENTION

In one aspect, the present invention provides for an inline fan housing assembly for housing a motorized impellor and connecting an inline fan housing to a conduit, the inline fan housing assembly comprising:
- an inline fan housing comprising an exhaust port and an inlet port;
- a first connector collar for connecting the inline fan housing to a conduit, the first connector collar comprising:
    - a body having a housing connection end of a diameter for connection with the inlet port of the inline fan housing and a conduit connection end of a diameter for connection with a conduit;
- the housing connection end in fluid communication with the conduit connection end;
- a second connector collar for connecting the inline fan housing to a conduit, the second connector collar comprising:
    - a body having a housing connection end of a diameter for connection with the exhaust port of the inline fan housing and a conduit connection end of a diameter for connection with a conduit, the housing connection end in fluid communication with the conduit connection; and
- an inner inlet ring for insertion into the inlet port, comprising an outer end configured for connection with the inlet port and an inner end of a diameter substantially the same as the motorized impellor for directing air drawn in through the inlet port into the motorized impellor,
- wherein the diameter of the housing connection end of each connector collar is different from the diameter of the conduit connection end of each connector collar.

In another aspect, the present invention provides for a method of securing a conduit to an inlet port of an inline fan housing comprising the steps of:
i) providing an inline fan housing with motorized impellor therein;
ii) inserting into the inlet port of the inline fan housing an inner inlet ring comprising an outer end configured for connection with the inlet port and an inner end of a diameter substantially the same as the motorized impellor for directing air drawn in through the inlet port into the motorized impellor;
iii) connecting to the inlet port a connector collar for connecting the inline fan housing to a conduit, the connector collar comprising:
a body having a housing connection end of a diameter for connection with the inlet port of the inline fan housing and a conduit connection end of a diameter for connection with a conduit; and
iv) connecting a conduit to the conduit connection end of the connector collar.

In another aspect, the present invention provides for a method of securing a conduit to an exhaust port of an inline fan housing comprising the steps of:

i) providing an inline fan housing with motorized impellor therein;

ii) connecting to the inlet port a connector collar for connecting the inline fan housing to a conduit, the connector collar comprising:

a body having a housing connection end of a diameter for connection with the exhaust port of the inline fan housing and a conduit connection end of a diameter for connection with a conduit; and iii) connecting a conduit to the conduit connection end of the connector collar.

The present invention allows for fewer inline fan housings to be stocked as one fan housing may be used and adapted for use with a variety of different diameter conduits and different sized impellers. The present invention also allows for fewer motorized impellers to be purchased and stored as one impellor may be used to efficiently circulate air through a variety of different diameter conduits.

Other objects and features of the invention will become apparent by reference to the following specification and to the figures.

DETAILED DESCRIPTION OF THE EXEMPLARY EMBODIMENTS

Figure 1:
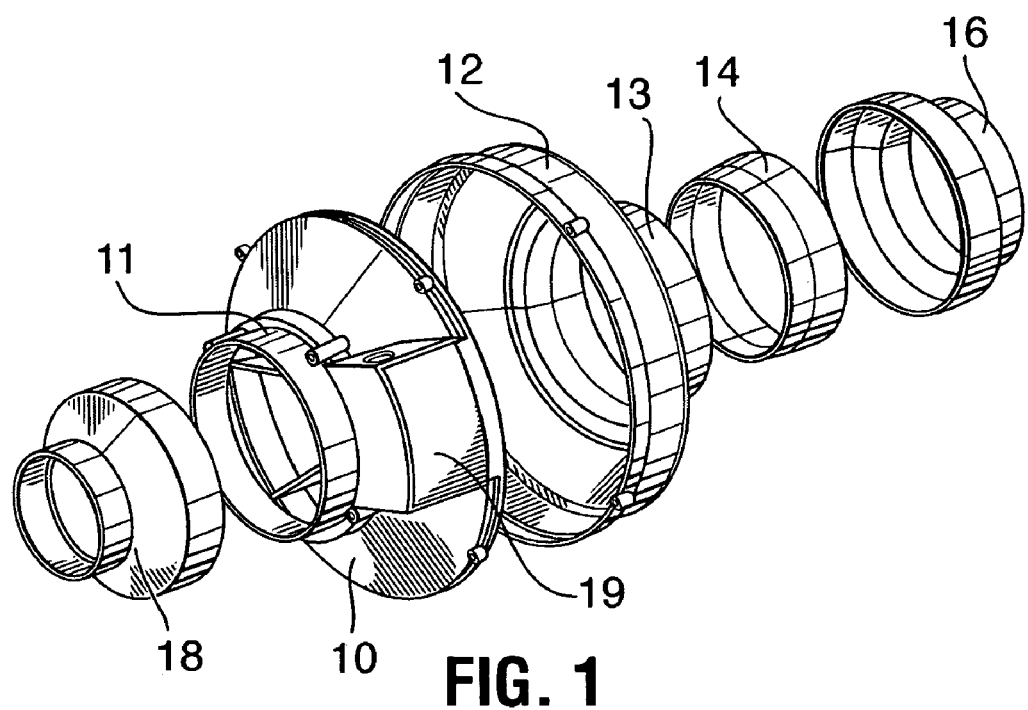
FIG. 1 is an exploded view of one embodiment showing generally an inline fan housing assembly comprising inlet and exhaust housings, connector collars and an inner inlet ring according to an embodiment of the present invention.

Embodiments of the present invention relate to an inline fan housing assembly adaptable for use with a variety of motorized impellors and a number of conduits of a different diameter. An inline fan housing assembly according to an embodiment of the present invention comprises a connector collar for attachment to an inline fan housing to permit connection with a conduit of a different diameter and an inner inlet collar for adapting the inline fan housing for use with a variety of impellor fans.

The connector collars 16, 18, 20 and 40, allow for integration of inline fan housings into ventilation systems comprising a conduit of a diameter which does not correspond with the size of the inlet and exhaust ports of the inline fan housing. For example, a 6 inch inline fan housing may be fitted with a connection collar which adapts the inlet or exhaust port to connect to a 4 inch conduit.

The connector collar may comprise a step comprising a run and a baffle, the run configured for connection with a conduit of a certain diameter, the baffle for effecting the necessary change in diameter. The baffle can be tapered to allow for more efficient air flow. The step decreases or increases the diameter of the port of the inline fan housing to allow connection of the inline fan housing to a conduit having a diameter different to that of the port of the inline fan housing. For example, a connector collar for adapting a 6 inch exhaust port with a 4 inch conduit may be attached to the exhaust port of a 6 inch inline fan housing which comprises a step with a run having a 4 inch diameter suitable for connection with a 4 inch conduit.

An embodiment of the present invention also provides for an adaptable connector collar for attachment to an inline fan housing which is adaptable to permit connection with conduits having a number of different diameters.

The adaptable connector collar allows for integration of inline fan housings and impellers into ventilations systems comprising conduits of diameters which do not correspond with the size of the inline fan housing and impellor. The adaptable connector collar is connected to the exhaust or inlet port of the inline fan housing and comprises an interface for connection to a conduit. The interface can be adaptable to permit connection with conduits of various diameters. This allows for a single adaptable connector collar to be used in a variety of applications to integrate inline fans into ventilation systems comprising various conduits.

The adaptable interface of the connector collar can comprise a number of steps each step configured for connection with a conduit of a certain diameter. Each step may be separated by baffles which may be removed together with the inner runs to increase the interior diameter of the interface thereby allowing for increased air flow through the connection. For example, an adaptable interface may contain three steps for attachment to a 4, 5 or 6 inch conduit. If attachment to a 6 inch conduit was desired, the removable baffles separating the 6 and 5 inch steps and the 5 and 4 inch steps could be removed thereby increasing the interior diameter of the collar to allow passage of air commensurate with a 6 inch connection.

A typical inline fan has an inlet housing and an exhaust housing each comprising a port of a suitable diameter to connect with the corresponding conduit. A fan or motorized impellor is mounted within a cavity defined by the housings for directing air from the inlet port out through the exhaust port. Embodiments of the present invention provide for a connector collar for attachment to the inlet port or the exhaust port to permit connection to a conduit of a different diameter.

An inline fan housing comprises an inner inlet collar for adapting the inlet port of the inline fan housing to direct air into a motorized impellor within the housing. This allows for an inline fan housing to be adapted for use with motorized impellors of different sizes. An inner inlet ring may also configured to adjust for the longitudinal gap between the exhaust port and the inlet face of the motorized impellor. Such a gap varies with substitution of different sized impellers.

For the purposes of this specification, the term "conduit" refers to any known shaft, duct, air source or component for channeling air in ventilation systems which may be connected to either the exhaust port or inlet port of an inline fan housing. Examples of conduits are ventilation shafts, ventilation ducts, filters and their components, air conditioners and their components, air heaters and their components and air treatments devices. Conduit also includes wall, ceiling and floor grates. A conduit may be used to channel air or other gases.

Figure 2:
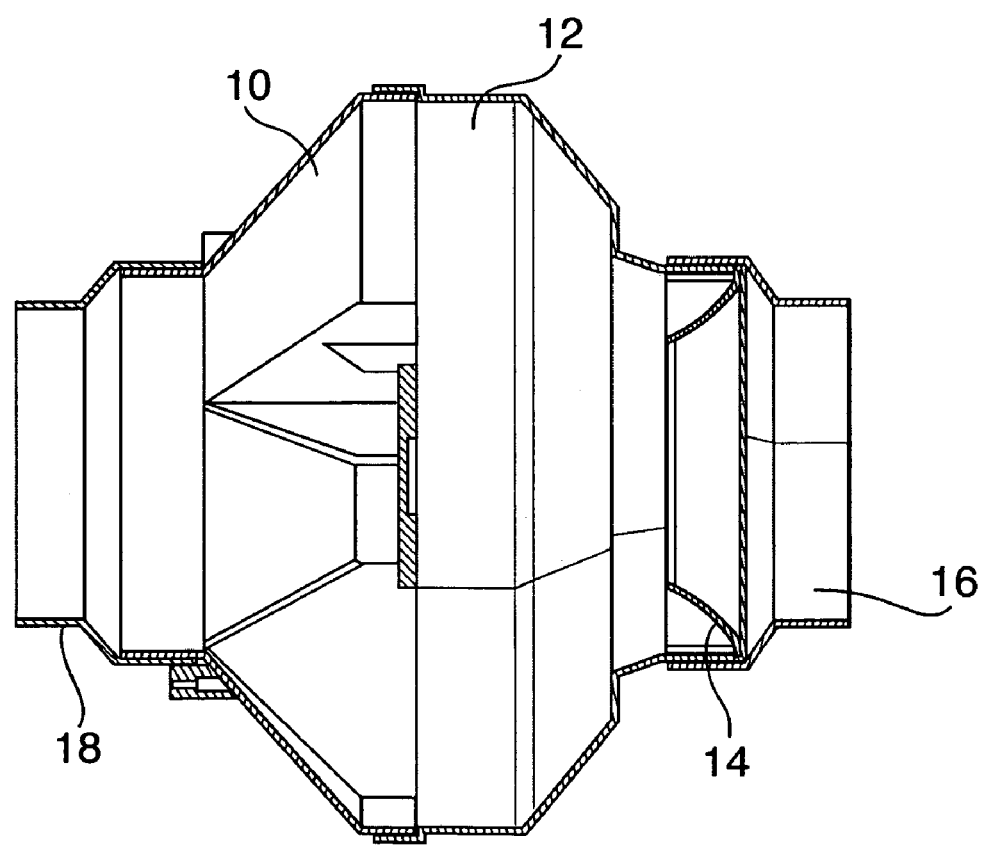
FIG. 2 is a cutaway view of the assembled fan housing assembly shown in FIG. 1.

One exemplary embodiment is shown in an exploded view in FIG. 1 and assembled in FIG. 2. A fan housing typically comprises an exhaust housing 10 connected to an inlet housing 12. The exhaust housing 10 comprises an exhaust port 11 of a diameter suitable for connection with either a conduit (not shown) of a certain diameter or an exhaust connector collar 18. The inlet housing 12 comprises an inlet port 13 of a diameter suitable for connection with a conduit (not shown) of a certain diameter or with an outer inlet connector collar 16. Together, the exhaust housing 10 and the inlet housing 12 form a cavity in which motorized impellers (not shown) of various sizes may be mounted for drawing air through the inlet port 13 and pushing it out through the exhaust port 11. The exhaust housing 10 is shown comprising an electrical connection box 19 for providing an electrical connector to supply power to the motorized impellor. The electrical connection box 19 can also be mounted directly on the inlet housing. Alternatively, any method of providing power to the motorized impellor may be used.

The exhaust connector collar 18 has a body with a housing connection end of a first diameter suitable for connection with the exhaust port 11 and a conduit connection end of a second diameter suitable for connection with a conduit. The body of the exhaust connector collar may comprise a step comprising a baffle configured for effecting the change in diameter and a run configured for connection to a conduit. The baffle may be tapered, uni-angular, multi-angular, convex, concave or be gradually tapered to effect the necessary change in the diameter from one end of the body to the other. However, other shapes that effect the necessary change in diameter may be used provided that one end of the exhaust connector collar is of a suitable diameter for connection with the exhaust port and the run of the step at the other end of the connector collar is of a suitable diameter for connection to a conduit.

The inlet housing 12 is shown used in conjunction with an inner inlet ring 14 and an outer inlet connector collar 16. The inner inlet ring 14 is usually positioned adjacent the interior surface of the inlet port 13. The inner inlet ring 14 has one end of a suitable diameter for connection to the inlet port 13 and the other end of a suitable diameter and depth for communication with the inlet face of a motorized impellor (not shown). The inner inlet ring 14 directs air flow into the motorized impellor and allows for inline fan housings of various sizes to be used with motorized impellors of various sizes. The outer inlet connector collar 16 has a housing connection end configured for connection with the inlet port 13 of the inlet housing 12 and a conduit connection end configured for connection with a conduit (not shown). The inner inlet ring 14 and the outer inlet connector collar 16 may be separate elements or may be unitary. If unitary, the outer inlet connector collar 16 therefore has a housing connection end of a diameter suitable for connection with the inlet port 13 and a conduit connection end of a suitable diameter for connection with a conduit and further comprises an inner ring extending from the inlet connection end for communication with the inlet face of a motorized impellor. The outer inlet connector collar 16 is particularly useful when the conduit has a diameter different to that of the inlet port 13 thereby allowing for connection of the inlet port and a conduit not originally designed for connection together. The body of the outer inlet connector collar 16 may comprise a step comprising a baffle for effecting the necessary change in diameter and a run configured for connecting to the conduit. The baffle may be a tapered, uni-angular, multi-angular, convex, concave or be gradually tapered to effect the necessary change in the diameter between the housing connection end and the conduit connection end. However, different shapes which effects the necessary change in diameter may be used provided that the housing connection end of the collar is of a suitable diameter for connection with the inlet port 13 and the run of the step of the conduit connection end of the collar is of a suitable diameter for connection to a conduit.

Conduits commonly attached to the inlet port are known in the art and include among others wall, floor and ceiling grates, other fans, cold or hot air generator sources such as a heater unit or air conditioning unit, air filters, air treatment devices, ventilation shafts, ventilation ducts, etc.

Figure 3:
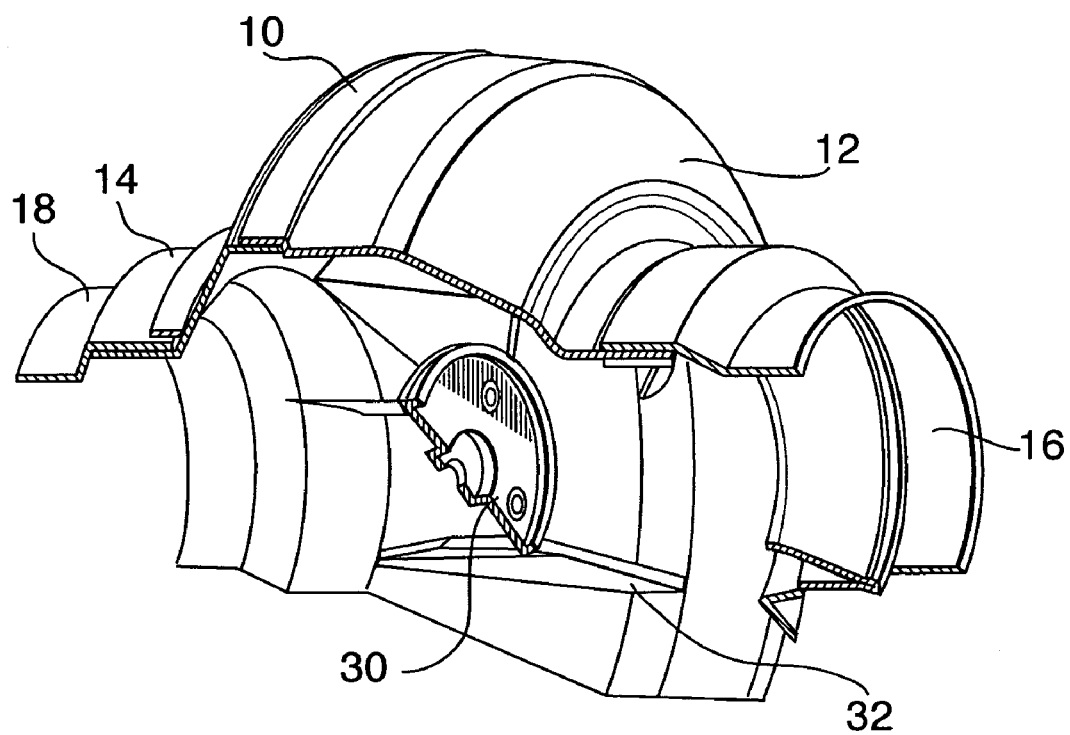
FIG. 3 is an elevation view of the cross-section of the assembled inline fan housing assembly of FIG. 2.

A cross-sectional view of the assembly is shown in FIG. 3. One embodiment of a mounting 30 for a motorized impellor is shown located in the cavity defined by the inlet housing 12 and the exhaust housing 10. The mounting 30 is supported by radial support brackets 32 mounted, in this case, to the interior wall of the exhaust housing 10. Alternatively, the mounting 30 may be supporting in any fashion which permits support of a motorized impellor such that the impellor positioned to push air out through the exhaust port. The support brackets 32 may alternatively be mounted to the inlet housing 12 or both the inlet and exhaust housings. The embodiment shown in FIG. 3 indicates that four support brackets are used, however, various number of support brackets may be used provided that they offer proper support and positioning for the mounting 30 and a motorized impellor.

Figure 10:
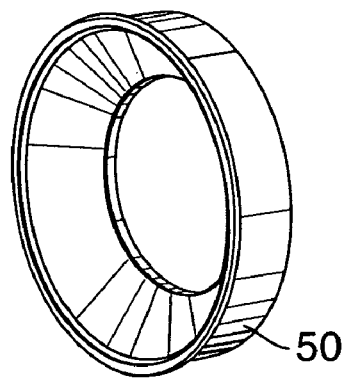
FIG. 10 is a perspective view of a connector collar of one embodiment of the present invention.
Figure 11:
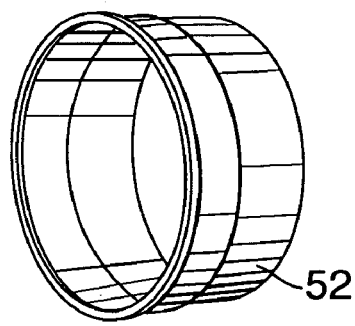
FIG. 11 is a perspective view of a connector collar of another embodiment of the present invention.
Figure 12:
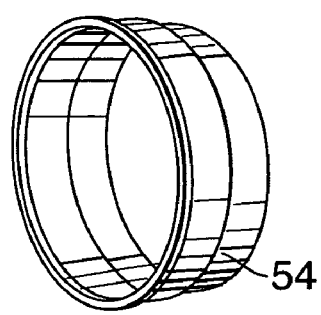
FIG. 12 is a perspective view of a connector collar of another embodiment of the present invention.

FIGS. 10, 11 and 12 show variants of the above connector collar as 50, 52 and 54, respectively. Various degrees of taper between ends, as well as convex and concave shapes may be used to effect the change in diameter between ends of the collar.

Figure 6:
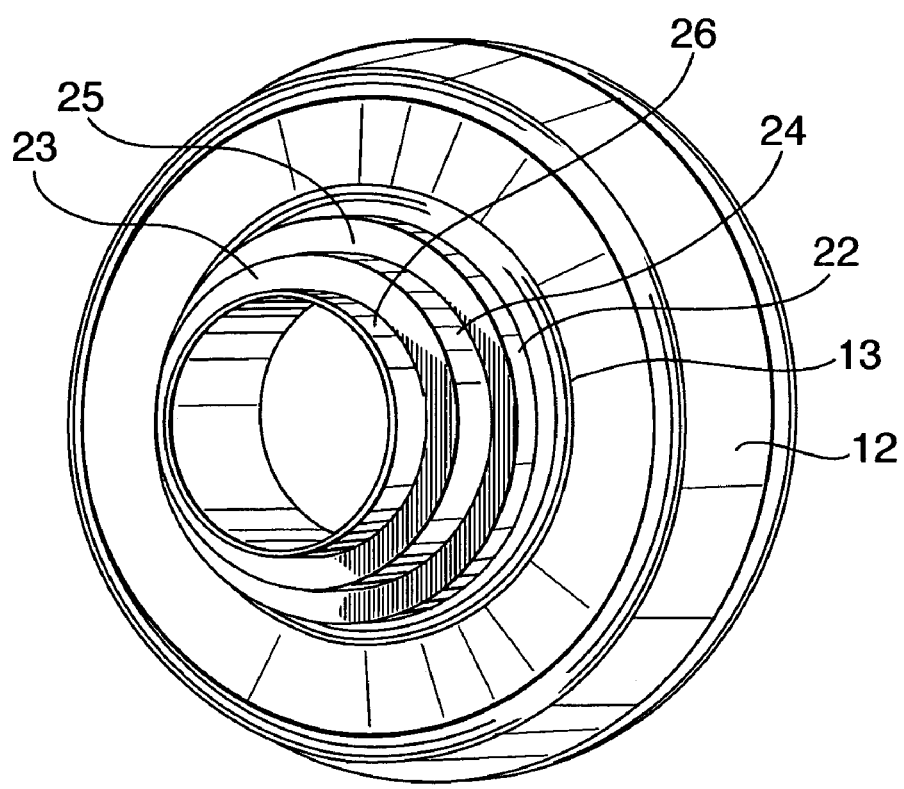
FIG. 6 another elevation view of the inlet housing and adaptable connector collar of FIG. 4.
Figure 4:
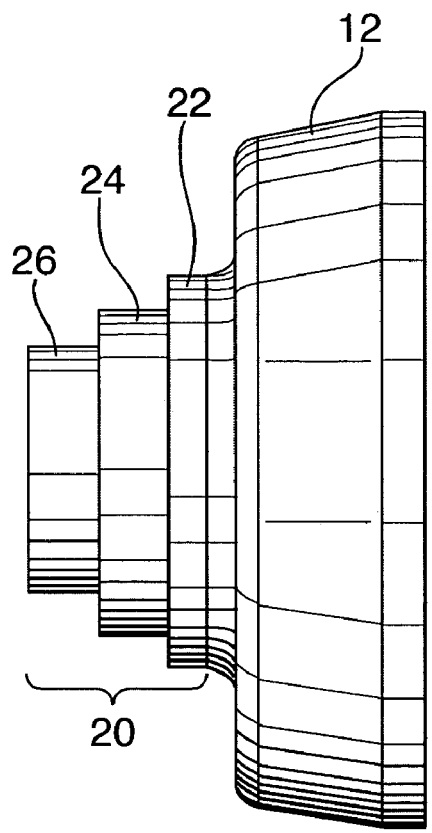
FIG. 4 is a side view of an inlet housing and adaptable connector collar according to an embodiment of the present invention.
Figure 5:
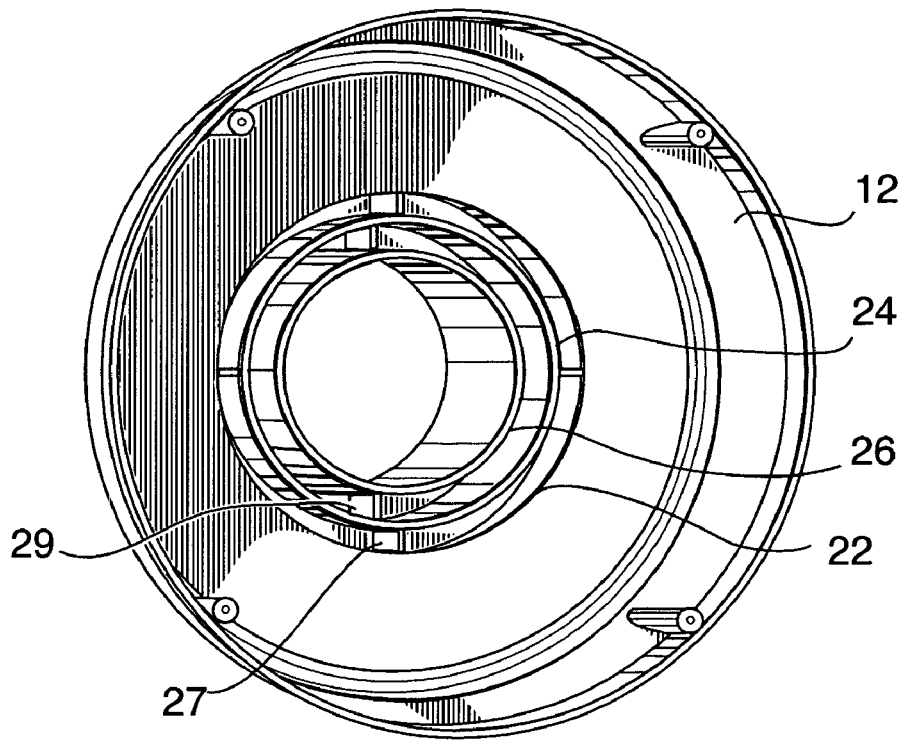
FIG. 5 is an elevation view of the inlet housing and adaptable connector collar of FIG. 4.

Another embodiment of the present invention provides for an adaptable connector collar for connection to the exhaust port 11 or the inlet port 13 as shown in FIGS. 4 to 9. The adaptable connector collar, 20 or 40, according to various embodiments of the present invention, allows for integration of inline fan housings and motorized impellors into ventilations systems comprising conduits of diameters which do not correspond with the size of the ports of the inline fan housing. This allows for a single adaptable connector collar, 20 or 40, to be used in a variety of applications to integrate inline fan housings and motorized impellers into ventilation systems comprising various conduits. One embodiment of an outer inlet connector collar 20 is shown in FIGS. 4, 5 and 6. An inlet housing 12 is shown attached to an outer inlet connector collar 20. The outer inlet connector collar 20 has a body with a housing connection end of a suitable diameter for connection with the inlet port 13 of the inlet housing 12. The conduit connector end of the body of the outer inlet connector collar 20 comprises a plurality of steps 22, 24 and 26. (For the purposes of this specification, the term "plurality" encompasses embodiments comprises two or more elements). Each step comprises a run, 22, 24, 26, 42, 44 and 46, configured for connection to a conduit (not shown) and a baffle, 23, 25, 43 and 45, for effecting the necessary change in diameter between the runs and for connecting each inner run to the adjacent outer run. The plurality of steps comprises a first outer step 22 followed by one or more subsequent inner steps 24 and 26. Each run of each step is of a different diameter, each diameter suitable for attachment to a conduit of a corresponding diameter. For example, step 22 may be for attachment to an 18 inch conduit, step 24 for attachment to a 16 inch conduit and step 26 for attachment to a 14 inch conduit. As can be seen in FIGS. 5 and 6, each subsequent inner step, 24 and 26 for example, is connected to the corresponding outer step, 22 and 24, respectively, by a baffle 23 and 25. Each baffle, 23 and 25, is removable thereby enabling removal of either or both of steps 24 and 26. This allows for removal of inner steps if a conduit is connected to either of steps 24 or 22 to avoid restricting the air flow through a smaller diameter step. The baffles 23 and 25 may be pre-scored to facilitate removal or may be removed with the appropriate cutting tool, such as tin-snips. The baffle may be a continuous annular ring or may be interrupted and not fully annular. The baffle between adjacent connected steps may be located anywhere between adjacent runs provided that it connects the adjacent runs.

The adaptable inlet collar 20 may further comprise one or more reinforcing struts, 27 and 29, between some or all of the runs 22, 24 and 26 of the steps. If the steps are removable, the struts, 27 and 29, are frangible allowing for removal of the inner steps.

The outer inlet connector collar 20 is not limited to three steps and may comprise only two steps or more than three. The steps need not be spaced identically apart and may include for example a 4 inch step, a 5 inch step, a 6 inch step and an 8 inch step.

Moreover, the subsequent steps need not be of a decreasing diameter and may be of an increasing diameter as the application demands.

An inner inlet ring (not shown) may also be used in conjunction with the adaptable inlet collar 20 for direction air into the motorized impellor.

Figure 7:
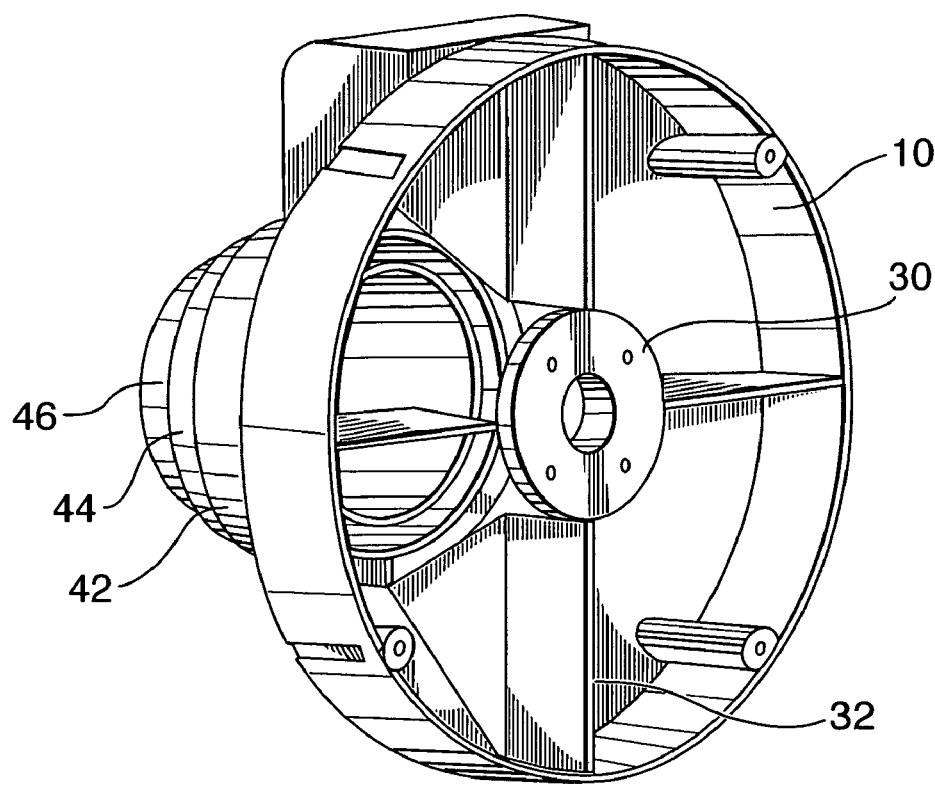
FIG. 7 is an elevation view of an exhaust housing and adaptable connector collar according to an embodiment of the present invention.
Figure 8:
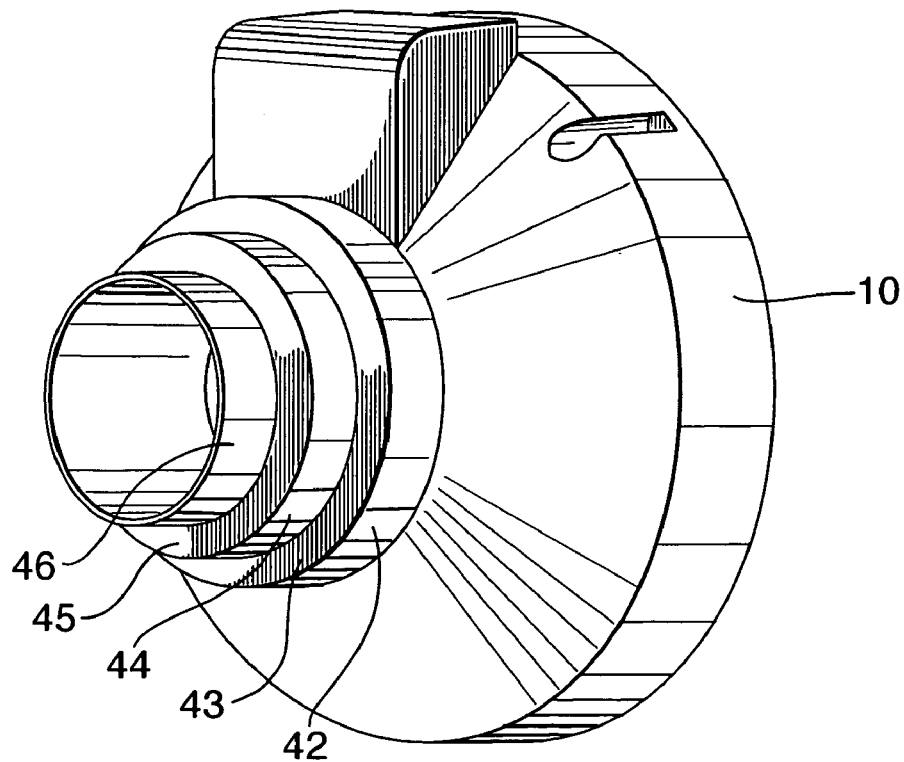
FIG. 8 is another elevation view of the exhaust housing and adaptable connector collar of FIG. 7.
Figure 9:
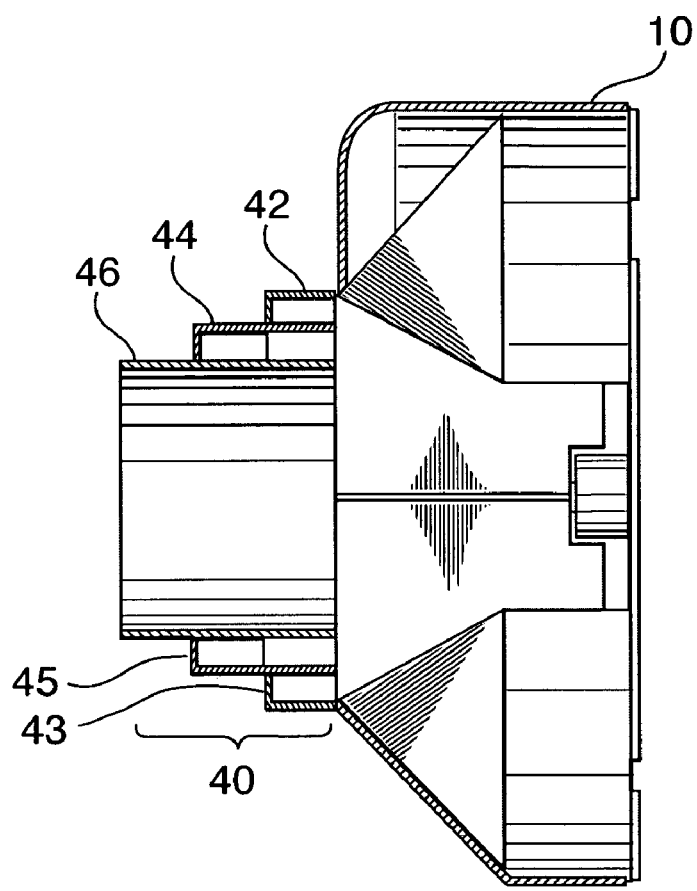
FIG. 9 is a cross section view of the exhaust housing and adaptable connector collar of FIG. 7.

An exhaust connector collar 40 of the present invention is shown in FIGS. 7, 8 and 9. As noted above, the exhaust housing 10 comprises a mounting 30 for a motorized impellor. The mounting 30 is supported by radial support mounts 32 connected to the interior of the exhaust housing 10. Mounted to the exhaust port is an exhaust connector collar 40. The exhaust connector collar 40 comprises a plurality of steps 42, 44 and 46. Each step comprises a run for connection to a conduit and a baffle for effecting the necessary change in diameter between the runs and for connecting each inner run to the adjacent outer run. The plurality of steps comprises a first outer step 42 followed by one or more subsequent inner steps 44 and 46. Each run has a different diameter and each diameter is suitable for connection to a conduit of a corresponding diameter. Each subsequent inner step, 44 and 46, is connected to the corresponding outer step, 42 and 44, respectively, by a baffle 43 and 45. Each baffle is a removable and connected to the adjacent run of neighboring steps such that inner steps may be selectively removed to allow less restricted exhaust flow if a conduit is attached to one of the outer steps 44 or 42. The baffle may be a continuous annular ring or may be interrupted and not fully annular. The baffle between adjacent connected steps may be located anywhere between adjacent runs provided that it connects the adjacent runs.

The adaptable exhaust collar 40 may further comprise one or more reinforcing struts (not shown), between some or all of the runs 42, 44 and 46 of the steps. If the steps are removable, the struts are frangible allowing for removal of the inner steps.

The exhaust connector collar 40 is not limited to three steps and may comprise only two steps or more than three. The steps need not be spaced identically apart and may include for example a 5 inch step, a 6 inch step, a 7 inch step and a 10 inch step.

Moreover, the subsequent steps need not be of a decreasing diameter and may be of an increasing diameter as the application demands.

When an exhaust connector collar 18 or 40, is connected in conjunction with an outer inlet connector collar 16 or 20, to the exhaust housing and inlet housing, respectively, the steps of the exhaust connector collar 18 or 40, need not correspond in diameter to the steps of the adaptable inlet exhaust connector collar 16 or 20.

An embodiment of the present invention provides for an inline fan housing where the exhaust port 11 or the inlet port 13 or both ports are substituted for one of the connection collars 16, 18, 20 or 40, of the present invention. Furthermore, the inline fan housing and substituted connection collar may be unitary in construction thereby foregoing the need for separate fan housings and connection collars.

Figure 15:
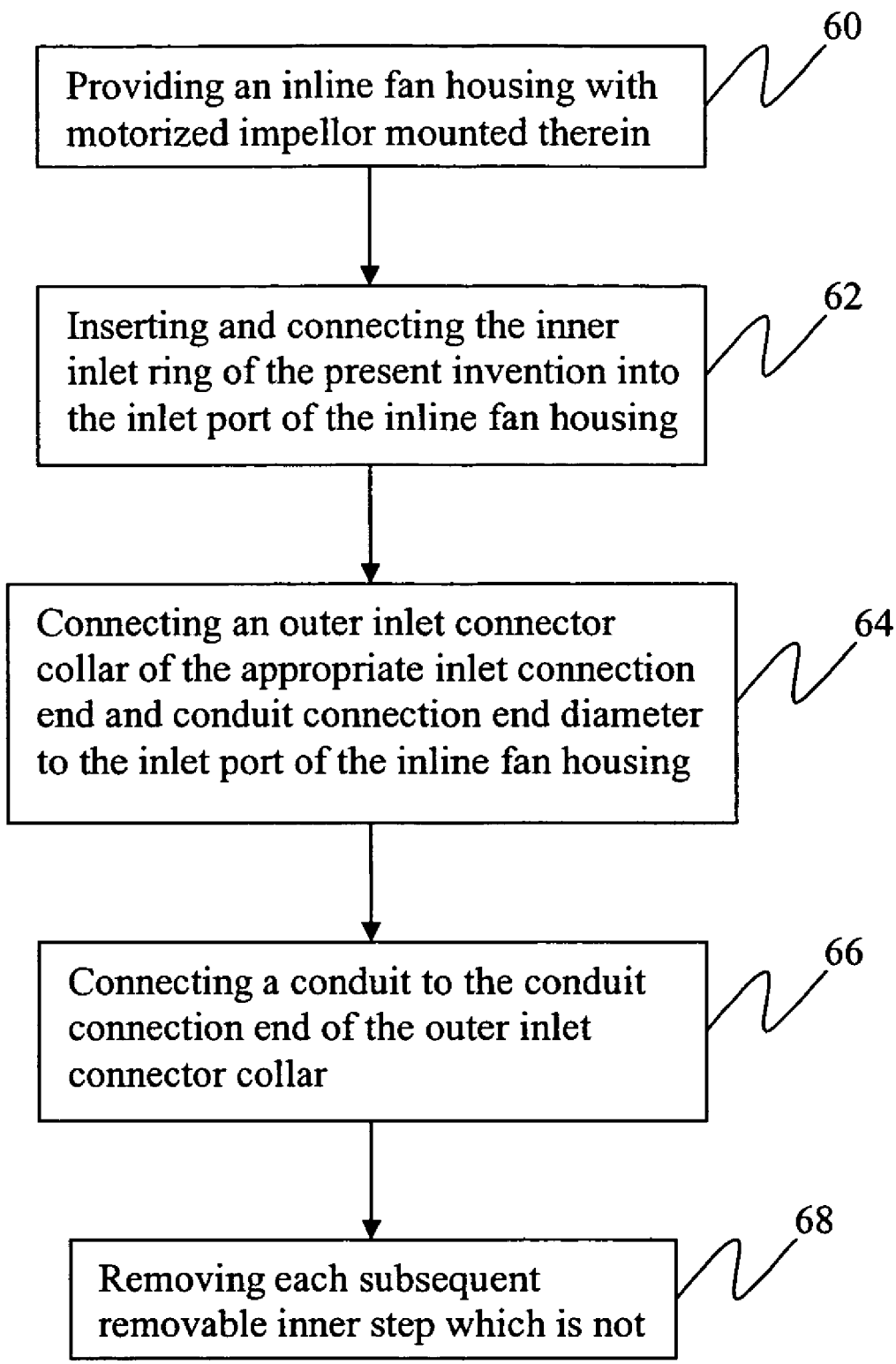
FIG. 15 is a flow chart showing a method of securing a conduit to an inlet port of an inline fan housing according to an embodiment of the present invention.

An embodiment of the present invention also provides for a method of securing a conduit to an inlet port of an inline fan housing. The method is shown with reference to FIG. 15 and comprises step 60 of providing an inline fan housing with motorized impellor mounted therein. The method includes step 62 of inserting and connecting the inner inlet ring of the present invention into the inlet port of the inline fan housing. Next is step 64 of connecting an outer inlet connector collar of the appropriate inlet connection end and conduit connection end diameter to the inlet port of the inline fan housing. The next step 66 is connecting a conduit to the conduit connection end of the outer inlet connector collar. Any known means of securing the components together may be used, for example screws, duct tape, adhesive, nails, etc. The above method may also be followed to connect a conduit to the exhaust port of the inline fan housing excluding step 62.

In cases where the conduit connection end of the outer inlet connector collar comprises a first outer step and at least one subsequent removable inner step, the method further comprises step 68 of removing each subsequent removable inner step which is not connected to the conduit.

The components of the fan assembly shown generally in FIGS. 2 and 3 may be connected using any known means such as for example, duct tape, screws, nails, adhesive etc.

EXAMPLES

A series of tests were conducted using different motorized impellors and inline fan housings, variable static pressures and variable conduit diameters. These were used to compare the relationships between airflow and static pressure for 4 inch, 5 inch and 6 inch conduits. In the tests, 133 mm, 190 mm and 220 mm impellor fans were used from EBM papst™. The results are shown below in tables 1 to 4. Additional testing was carried out using the 150 series fan from Fantech™.

Figure 13:
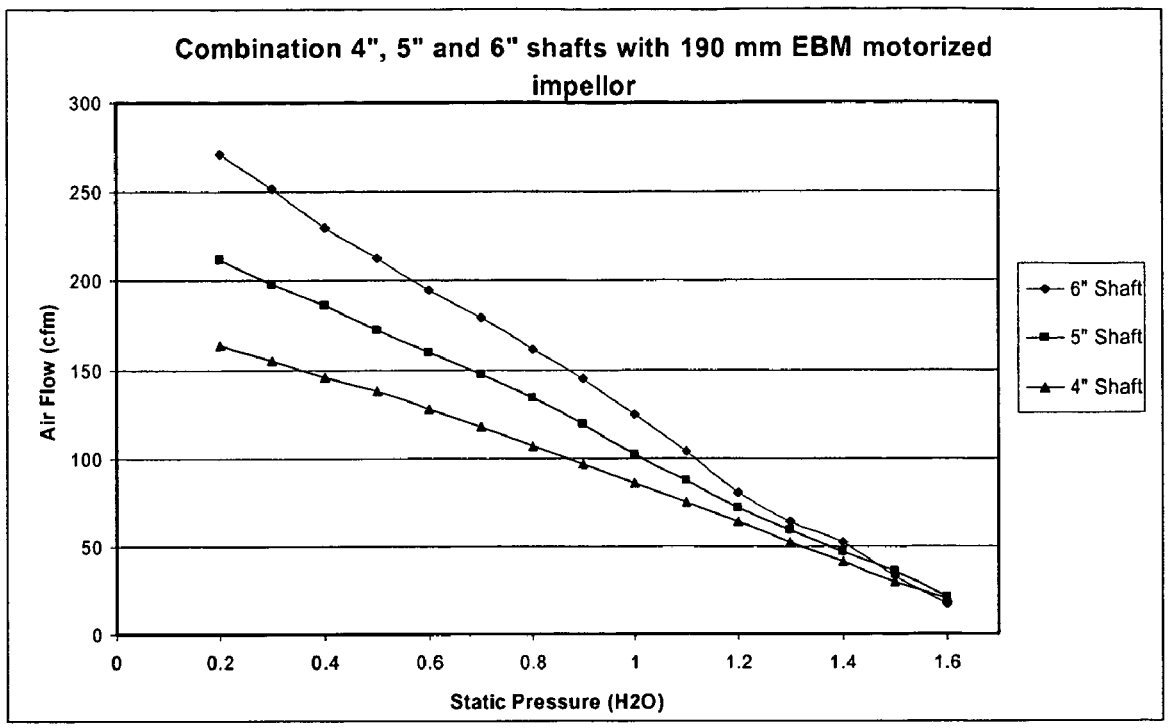
FIG. 13 is a graph of airflow versus static pressure for an inline fan used in conjunction with an adaptable connector collar according to an embodiment of the present invention.
Figure 14:
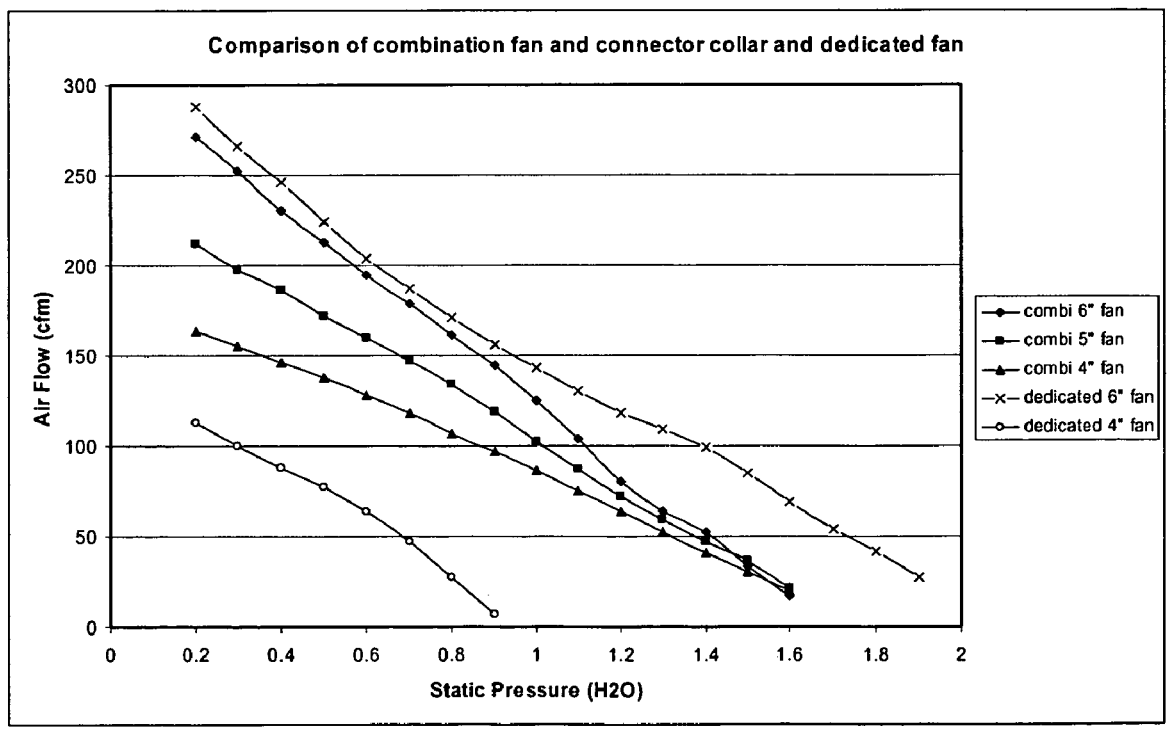
FIG. 14 is a graph of airflow versus static pressure comparing an inline fan used in conjunction with an adaptable connector collar according to an embodiment of the present invention and dedicated inline fans.

The test results from the EBM papst tests are graphically illustrated in graphs of FIGS. 13 and 14.

The tests indicate that a 190 mm motorized impellor referred to as the "combi fan", performs nearly as well when used in conjunction with the connector collars of the present invention connected to a 6 inch conduit, as a standard 6 inch motorized impellor connected to a 6 inch conduit. Furthermore, the test indicates that the 190 mm motorized impellor used in conjunction with the connector collar of the present invention connected to a 4 inch motorized impellor outperforms the standard 4 inch fan connected to a 4 inch conduit using connector collars according to various embodiments of the present invention.

Table 1 shows the test results using a 190 mm motorized impellor used in conjunction with an exhaust housing and a connector collar according to an embodiment of the present invention comprising steps with diameters adapted for connection with 6, 5 and 4 inch conduits. The results of Table 1 are illustrated in Graph 1 of FIG. 13.

TABLE 1

EBM 190 Motor - 6, 5 and 4 inch ventilation shafts using combination motor and connector collar

| 6 Inch Ventilation Shaft | | | 5 Inch Ventilation Shaft | | | 4 Inch Ventilation Shaft | | |
|---|---|---|---|---|---|---|---|---|
| Static pressure ($H_2O$) | Outlet (cfm) | Watts | Static pressure ($H_2O$) | Outlet (cfm) | Watts | Static pressure ($H_2O$) | Outlet (cfm) | Watts |
| 0.20 | 271 | 85 | 0.20 | 212 | 85 | 0.20 | 164 | 83 |
| 0.30 | 252 | 85 | 0.30 | 198 | 85 | 0.30 | 155 | 83 |
| 0.40 | 230 | 85 | 0.40 | 186 | 85 | 0.40 | 146 | 83 |
| 0.50 | 213 | 85 | 0.50 | 172 | 84 | 0.50 | 138 | 83 |
| 0.60 | 195 | 85 | 0.60 | 160 | 84 | 0.60 | 128 | 82 |
| 0.70 | 179 | 84 | 0.70 | 147 | 83 | 0.70 | 118 | 82 |
| 0.80 | 161 | 84 | 0.80 | 134 | 83 | 0.80 | 107 | 81 |
| 0.90 | 145 | 83 | 0.90 | 119 | 82 | 0.90 | 97 | 80 |
| 1.00 | 125 | 81 | 1.00 | 102 | 21 | 1.00 | 86 | 79 |
| 1.10 | 104 | 80 | 1.10 | 87 | 79 | 1.10 | 75 | 78 |
| 1.20 | 80 | 78 | 1.20 | 72 | 78 | 1.20 | 64 | 77 |
| 1.30 | 64 | 76 | 1.30 | 59 | 76 | 1.30 | 52 | 76 |
| 1.40 | 52 | 75 | 1.40 | 47 | 75 | 1.40 | 41 | 74 |
| 1.50 | 33 | 73 | 1.50 | 36 | 73 | 1.50 | 30 | 73 |
| 1.60 | 17 | 71 | 1.60 | 21 | 71 | 1.60 | 20 | 71 |

Table 2 shows the test results using a 190 mm motor used in conjunction with an exhaust housing and a connector collar according to another embodiment of the present invention adapted for use with 6, 5 and 4 inch conduits.

TABLE 2

EBM 190 Motor - 6, 5 and 4 inch ventilation shafts using combination motor and prototype connector collar

| 6 Inch Ventilation Shaft | | | 5 Inch Ventilation Shaft | | | 4 Inch Ventilation Shaft | | |
|---|---|---|---|---|---|---|---|---|
| Static pressure ($H_2O$) | Outlet (cfm) | Watts | Static pressure ($H_2O$) | Outlet (cfm) | Watts | Static pressure ($H_2O$) | Outlet (cfm) | Watts |
| 0.15 | 262 | 80 | 0.15 | | | 0.15 | | |
| 0.20 | 257 | 80 | 0.20 | | | 0.20 | | |
| 0.25 | | | 0.25 | 197 | 81 | 0.25 | | |
| 0.30 | 237 | 80 | 0.30 | 191 | 79 | 0.30 | 147 | 79 |
| 0.40 | 217 | 80 | 0.40 | 178 | 79 | 0.40 | 138 | 79 |
| 0.50 | 197 | 80 | 0.50 | 166 | 79 | 0.50 | 131 | 79 |
| 0.60 | 183 | 80 | 0.60 | 153 | 79 | 0.60 | 121 | 78 |
| 0.70 | 170 | 80 | 0.70 | 140 | 79 | 0.70 | 114 | 77 |
| 0.80 | 155 | 79 | 0.80 | 126 | 78 | 0.80 | 105 | 77 |
| 0.90 | 142 | 78 | 0.90 | 109 | 77 | 0.90 | 93 | 76 |
| 1.00 | 124 | 78 | 1.00 | 96 | 76 | 1.00 | 82 | 75 |
| 1.10 | 108 | 76 | 1.10 | 80 | 75 | 1.10 | 72 | 74 |
| 1.20 | 87 | 75 | 1.20 | 67 | 74 | 1.20 | 59 | 73 |
| 1.30 | 73 | 74 | 1.30 | 57 | 72 | 1.30 | 48 | 72 |
| 1.40 | 54 | 71 | 1.40 | 44 | 70 | 1.40 | 38 | 70 |
| 1.50 | 40 | 69 | 1.50 | 33 | 68 | 1.50 | 27 | 67 |
| 1.60 | 26 | 67 | 1.60 | 17 | 65 | 1.60 | 15 | 62 |

Table 3 shows the test results for a dedicated 4 inch motor when used in conjunction with an exhaust connector collar according to an embodiment of the present invention. The test indicates that better air flow can be achieved by used a larger motorized impellor in conjunction with the connection collars. For this test, an exhaust housing having a 6 inch exhaust port was used together with an exhaust connector collar comprising two steps to reduce the diameter for suitable connection with a 4 inch conduit.

TABLE 3

EBM 133 Motor - 4 inch ventilation shafts connected to a connector collar of the present invention having two reducing steps

| Static pressure ($H_2O$) | Outlet (cfm) | Watts |
|---|---|---|
| 0.20 | 113 | 20 |
| 0.30 | 100 | 20 |
| 0.40 | 88 | 20 |
| 0.50 | 77 | 20 |
| 0.60 | 64 | 19 |
| 0.70 | 47 | 18 |
| 0.80 | 27 | 16 |
| 0.90 | 7 | 14 |

Table 4 shows the test results for a dedicated 6 inch motor, 220 mm EBM motorized impellor, when connected to a 6 inch conduit. The test indicates the airflow is only slightly better than that achieved by the smaller 190 mm motorized impellor used in conjunction with a connector collar according to an embodiment of the present invention.

TABLE 4

EBM 220 motor - 6 inch ventilation shaft

| Static pressure ($H_2O$) | Outlet (cfm) | Watts |
|---|---|---|
| 0.20 | 288 | 121 |
| 0.30 | 266 | 121 |
| 0.40 | 246 | 120 |
| 0.50 | 224 | 120 |
| 0.60 | 204 | 119 |
| 0.70 | 187 | 118 |
| 0.80 | 171 | 117 |
| 0.90 | 156 | 116 |

TABLE 4-continued

EBM 220 motor - 6 inch ventilation shaft

| Static pressure (H₂O) | Outlet (cfm) | Watts |
|---|---|---|
| 1.00 | 143 | 115 |
| 1.10 | 130 | 113 |
| 1.20 | 118 | 112 |
| 1.30 | 109 | 110 |
| 1.40 | 99 | 108 |
| 1.50 | 85 | 105 |
| 1.60 | 69 | 103 |
| 1.70 | 54 | 99 |
| 1.80 | 42 | 96 |
| 1.90 | 27 | 93 |

The test results shown in tables 3 and 4 are the average test results from collected data. The above results indicate that for at least 4 to 6 inch diameter conduits, one motorized impellor size used in conjunction with a connection collar according to an embodiment of the present invention is nearly as efficient for 6 inch applications and more efficient for 4 inch applications.

Embodiments of the present invention therefore provide for a single fan housing to be used together with connection collars of the present invention for a variety of the ventilation systems comprising conduits each of different diameters. It may be said that the efficiency of the system can be maintained or improved by using the fan housing and connector collar as fan size may be varied without sacrificing the connection between the fan housing and conduit.

Although conduits having a circular cross-section are disclosed in this specification, the principle of providing a connector collar with steps of a different size to allow connection of a fan housing to a conduit also applies to conduits having a square or rectangular cross-section.

The connector collars of the present invention may be made from known materials, for example metal, metal alloys or polymers as may the fan housings.

Any known fan housing may be used in connection with connector collars and inner inlet rings of the present invention.

The fan housing may house known motorized impellors including motors with automatic reset thermal overload protection.

The fan housings and connector collars of the present invention may be provided in sizes allowing for air movement of as little as 80 cfm and up to and greater than 700 cfm.

For the purposes of this specification, the term "air" encompasses air as well as other gases which may be circulated through a ventilation system or conduit.

The above description of the exemplary embodiments and exemplary test results should not be interpreted in any limiting manner as variations and refinements are possible which are within the scope of the invention. The scope of the invention is defined in the appended claims and their equivalents.

The invention claimed is:

1. An inline fan housing assembly for housing a motorized impellor and connecting an inline fan housing to a conduit, the inline fan housing assembly comprising:
   an inline fan housing comprising an exhaust port and an inlet port;
   a first connector collar for connecting the inline fan housing to a conduit, the first connector collar comprising:
      a body having a housing connection end of a diameter for connection with the inlet port of the inline fan housing and a conduit connection end of a diameter for connection with a conduit;
      the housing connection end in fluid communication with the conduit connection end;
   a second connector collar for connecting the inline fan housing to a conduit, the second connector collar comprising:
      a body having a housing connection end of a diameter for connection with the exhaust port of the inline fan housing and a conduit connection end of a diameter for connection with a conduit, the housing connection end in fluid communication with the conduit connection; and
   an inner inlet ring for insertion into the inlet port, comprising an outer end configured for connection with the inlet port and an inner end of a diameter substantially the same as the motorized impellor for directing air drawn in through the inlet port into the motorized impellor,
   wherein the diameter of the housing connection end of each connector collar is different from the diameter of the conduit connection end of each connector collar.

2. The inline fan housing assembly of claim 1, wherein the diameter of the housing connection end of each connector collar is larger than the diameter of the conduit connection end of each connector collar.

3. The inline fan housing assembly of claim 1, wherein the conduit connection end of at least one of the first and second connector collars comprises:
   a first outer step and at least one subsequent inner step, each subsequent inner step of a smaller diameter, each step comprising a run configured for connection with a conduit of a corresponding diameter and a baffle configured for connection between adjacent runs of each step to effect the change in diameter between each step.

4. The inline fan housing assembly of claim 3, wherein each subsequent inner step is removably connected;
   whereby removal of the inner steps having a diameter smaller than a conduit to be connected allows for greater air flow through the connector collar.

5. The inline fan housing assembly of claim 3, wherein each baffle is removably connected to adjacent runs, each baffle is annular and is pre-scored to facilitate removal.

6. The inline fan housing assembly of claim 3, wherein each run extends at one end to a point substantially flush with the housing connection end.

7. The inline fan housing assembly of claim 3, comprising two subsequent inner steps.

8. The inline fan housing assembly of claim 3, wherein the baffle is tapered, uni-angular, multi-angular, convex or concave.

9. The inline fan housing assembly of claim 3, further comprising a frangible strut between one or more adjacent runs.

10. The inline fan housing assembly of claim 1, wherein the first connector collar is connected in place of the inlet port.

11. The inline fan housing assembly of claim 1, wherein the second connector collar is connected in place of the exhaust port.

12. The inline fan housing assembly of claim 1, wherein the fan housing and the first and second connector collars are unitary in construction.

13. The inline fan housing assembly of claim 1, wherein the fan housing and the inner inlet ring are unitary in construction.

14. A method of securing a conduit to an inlet port of an inline fan housing comprising the steps of:
   i) providing an inline fan housing with motorized impellor therein;
   ii) inserting into the inlet port of the inline fan housing an inner inlet ring comprising an outer end configured for connection with the inlet port and an inner end of a diameter substantially the same as the motorized impellor for directing air drawn in through the inlet port into the motorized impellor;
   iii) connecting to the inlet port a connector collar for connecting the inline fan housing to a conduit, the connector collar comprising:
      a body having a housing connection end of a diameter for connection with the inlet port of the inline fan housing and a conduit connection end of a diameter for connection with a conduit; and
   iv) connecting a conduit to the conduit connection end of the connector collar.

15. The method of claim 14, wherein the conduit connection end of the connector collar comprises a first outer step and at least one subsequent removable inner step, each subsequent removable inner step of a smaller diameter, and the method further comprises the step of:
   v) removing each subsequent removable inner step which is not connected to the conduit.

16. A method of securing a conduit to an exhaust port of an inline fan housing comprising the steps of:
   i) providing an inline fan housing with motorized impellor therein;
   ii) connecting to the inlet port a connector collar for connecting the inline fan housing to a conduit, the connector collar comprising:
      a body having a housing connection end of a diameter for connection with the exhaust port of the inline fan housing and a conduit connection end of a diameter for connection with a conduit; and
   iii) connecting a conduit to the conduit connection end of the connector collar, wherein the conduit connection end of the connector collar comprises a first outer step and at least one subseciuent removable inner step, each subseciuent removable inner step of a smaller diameter, and the method further comprises the step of:
   iv) removing each subsequent removable inner step which is not connected to the conduit.

\* \* \* \* \*